Aug. 15, 1933. J. G. ACEVES Re. 18,916
SUPPLY CIRCUITS FOR RADIO SETS
Original Filed April 29, 1922
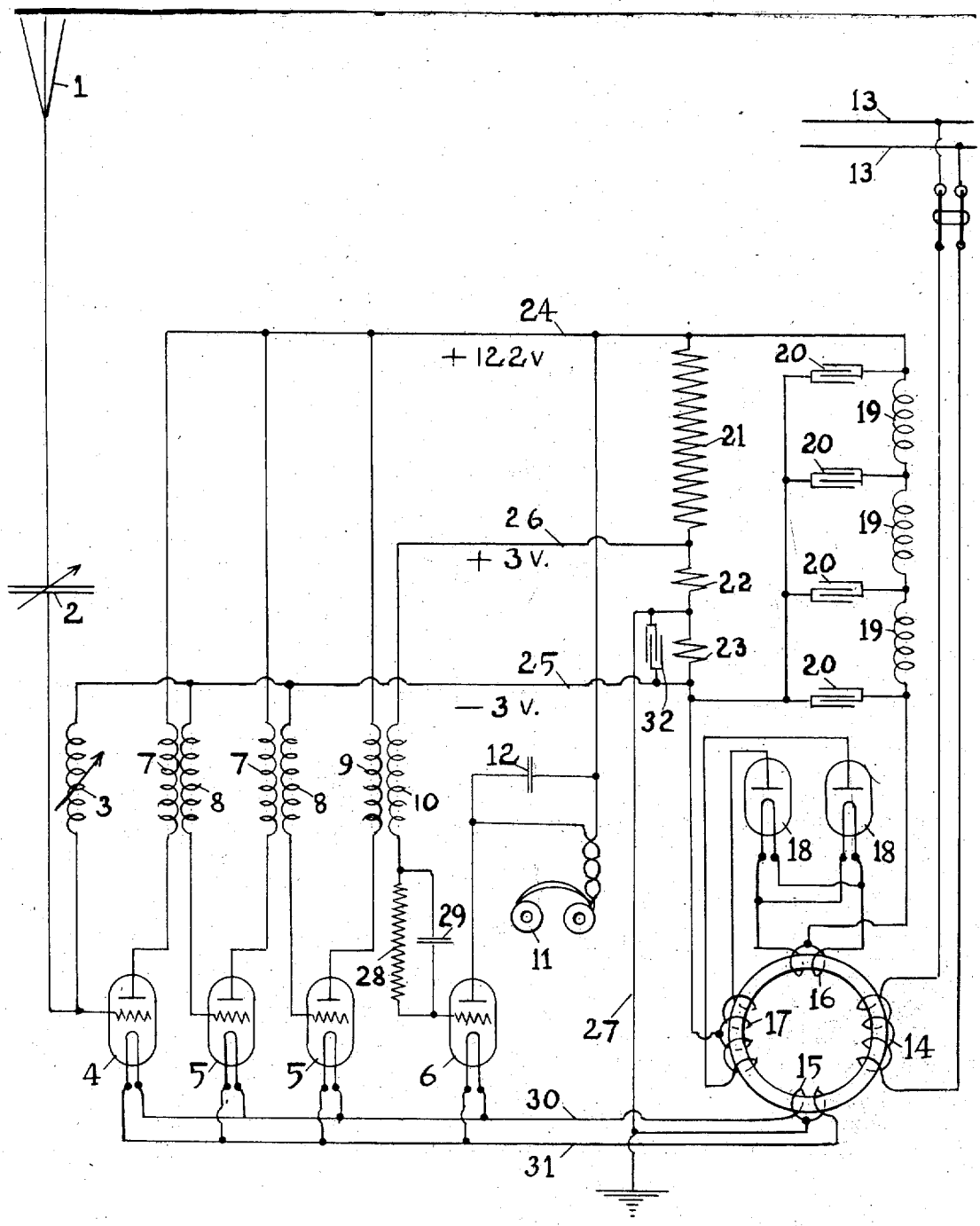
Inventor,
Julius Gourgues Aceves,
By Samuel W. Balch
Attorney.

Reissued Aug. 15, 1933 Re. 18,916

UNITED STATES PATENT OFFICE 18,916

SUPPLY CIRCUITS FOR RADIO SETS

Julius Gourgues Aceves, New York, N. Y., assignor, by mesne assignments, to Radio Corporation of America, New York, N. Y., a Corporation of Delaware Original No. 1,622,170, dated March 22, 1927, Serial No. 557,348, April 29, 1922. Application for reissue March 20, 1929. Serial No. 348,655

17 Claims. (Cl. 250—27)

This invention relates to radio communication apparatus and the like. More particularly it relates to radio communication apparatus such as receiving sets, and to the manner of supplying energy to the vacuum tubes of such sets.

An object of this invention is to provide for the vacuum tubes of such a set means for supplying from a single source of direct current energy a high potential for the plates and a low grid bias voltage which is negative for the amplifier tubes. A further object is to provide a low grid bias voltage from such source which is positive for the detector tubes. A further object of this invention is to provide the source of direct current energy from a commercial alternating current source and deliver direct current of requisite uniformity and voltages to the several parts of a radio set.

In the accompanying sheet of drawing which forms a part of this specification, the figure is a diagrammatic representation of one embodiment of the invention in a receiving set.

An antenna 1 is connected to ground through an adjustable condenser 2 and an adjustable inductance coil 3. There are three radio frequency tubes 4, 5, 5, and a detector tube 6 connected in cascade. The grid of the first radio frequency tube 4 is shown directly connected to the antenna circuit, the grids of the second and third radio frequency tubes 5, 5 are each connected to the plates of the preceding radio frequency tube inductively through an amplifying transformer with a primary coil 7 and a secondary coil 8. The invention is not limited to any particular number of radio frequency tubes, nor is the invention limited to a single detector tube. The grid of the detector tube is connected to the plate of the last radio frequency tube in cascade inductively through an amplifying transformer with a primary coil 9 and a secondary coil 10. A telephone receiver 11 is connected to the plate of the detector tube and is shunted by a condenser 12.

Leads 13, 13 are a source of alternating current, for example, 110 volts at sixty cycles, and connect to a primary coil 14 of a transformer with three secondary coils of which one of the transformer coils 15 is connected to the filaments of the radio frequency tubes and the detector tube. Two secondary coils 16, 17 are connected to two rectifiers 18, 18, the former in a circuit with the filaments and each end of the latter to one of the plates of the rectifiers. From the middle point of one of the secondary coils connected with the rectifier tubes is a circuit through a filter for suppressing the alternating components, which consists of a series of sections with choke coils or resistances or both 19, 19 in series and condensers of large capacity 20, 20 in multiple. From the further end of the filter the circuit is continued through resistance sections 21, 22, 23 to the middle point of the other of the transformer secondary coils which is connected with the rectifier. The two rectifier tubes are so connected that each passes opposite half waves, and the connections to the circuit through the filter and resistance sections is such that both sets of half waves as impressed on this circuit are of the same sign. Bus-bars 24, 25 are led from the terminals of the series of resistances and between them there will be a difference of potential equal to the voltages of the direct current generated, for example, 125 volts. Bus-bars 26, 27 are led from intermediate points of the series of resistances and the latter is grounded, and the resistances are so proportioned that bus-bar 24 will be 122 volts positive, that bus-bar 26 will be 3 volts positive and bus-bar 25 will be 3 volts negative, all with respect to the grounded bus-bar.

The primary coils of the transformers which connect the radio frequency tubes are connected to the bus-bar 24 and the far end of the filter. The secondary coils of the transformers which connect the amplifyng tubes are connected to the bus-bar 25 on which there is a negative potential of three volts with respect to the filaments. The secondary coil of the transformer between the last of the amplifying tubes and the detector tube is connected to the bus-bar 26 on which there is a positive potential of three volts with respect to the filaments. The other end of this secondary coil is connected to the grid of the detector tube through a leak resistance 28 shunted by a condenser 29 for the rectification of the signals. The filaments of the amplifying tubes and of the detector tube are connected to two bus-bars 30, 31 which lead from the ends of the secondary coil 15 and the middle point of this secondary coil is grounded so that the filaments will have an average zero potential.

The connection of the antenna circuit to ground is through the resistance 23 and a condenser 32 in parallel with the resistance.

All of the apparatus herein described is of familiar construction. The object of the various bus-bars is to light the filaments and impress upon the grids and plates of the tubes the proper voltages with respect to the filaments for straight amplification or rectification as the case may be. Thus for amplification the grid must be negative with respect to the filament, therefore the voltage of the grids of tubes 4, 5, 5, must be negative with respect to the filaments of these tubes which may be about one-fortieth of the plate voltage; but for rectification the grid must have a plus voltage with respect to the filament, and therefore the grid of tube 6 must carry a positive charge with respect to its filament, which is customarily about one-fortieth of the plate voltage.

To this end the system is arranged as hereinafter explained so that the voltages across the bus-bars are as follows: between 24 and 27, for example, 122 volts; between 25 and 27 minus 3 volts; between 26 and 27 plus 3 volts. The voltage between 30 and 31 is whatever is necessary and convenient to light the filament with a current of low voltage and high amperage.

The difference of voltage impressed upon the filaments is determined by the number of turns in the secondary coil 15, and the middle point of this coil is grounded. For use with commercial tubes this coil should develop about six volts.

The secondary coil 16 of the transformer will supply about seven volts to light the filaments of the rectifiers. Secondary coil 17 is a high voltage winding. From its two halves in opposite phase, alternating current is carried to the plates of the two rectifiers with the result that a pulsating electromotive force is carried to a filter by which it is converted into direct current potential. The circuit of the direct current is through the coils or resistances of the filter and the resistances 21, 22, 23 back to the middle point of secondary coil 17.

In ordinary usage bus-bar 25 should have a voltage of about minus 3 volts to which it charges the grids of the amplifier tubes 4, 5, 5; and bus-bar 26 has a voltage of about plus 3 volts to which it charges the grid of the detector tube 6.

An electrical engineer will easily determine the resistances necessary to secure the object set forth in any particular apparatus connected up as herein indicated.

Where a set is so connected a slight but not seriously disturbing hum of a frequency of 120 cycles is heard with the telephone close to the ear, due to the asymmetrical characteristics of the vacuum tubes and to the shift of thermionic current from one end of the filament to the other as the voltages alternate at the rate of sixty per second. From theoretical considerations confirmed by experiment it is found that the disturbance which causes the hum is proportional to the square of the filament voltage. For this reason resistance of filaments of the amplifying and detector tubes should be as low as practicable if an audio-frequency amplifier is desired. For such use tubes should be operated with as low frequency as practicable.

This application is an application for a reissue of the Letters Patent, No. 1,622,170, granted March 22, 1927 on an application filed by me April 29, 1922, Serial Number 557,348.

What I claim and desire to secure by Letters Patent of the United States, is

1. In a radio set, the combination of an amplifying tube, means for heating the filament of the tube, a connecting circuit, a source of direct-current energy in separate circuits from the circuit for heating the filament having its positive end connected to the anode and its negative end connected to the grid of the tube, a resistance connected between the two ends of the direct-current source, and a conductive connection between an intermediate point of the resistance and the filament circuit, whereby the grid is made more negative than the negative end of the filament.

2. In a radio set, the combination of an amplifying tube having an anode, a filament and a control grid, means for impressing signal variations between said filament and said control grid, means for heating said filament, a connecting circuit, a source of direct current energy in separate circuits from the circuit for heating said filament, said source of direct current energy having its positive end connected to said anode and its negative end connected to said control grid, a resistance connected between the two ends of said source of direct current, and a conductive connection between an intermediate point of said resistance and the filament circuit whereby said control grid is made more negative than the negative end of the filament.

3. Radio communication apparatus comprising, an amplifying tube having an anode, a cathode and a control electrode, means for impressing signal variations between said cathode and said control electrode, a source of electrical energy for heating said cathode, a source of direct current energy separate from said first mentioned source, said source of direct current energy having its positive end connected to said anode and its negative end connected to said control electrode, a resistance connected across said source of direct current, and a conductive connection from an intermediate point of said resistance to said cathode whereby said control electrode is maintained more negative than the most negative part of said cathode.

4. In a radio set, the combination of a space discharge device having an anode, a cathode and a control grid, means for impressing signal variations between said cathode and said control grid, a source of direct current energy, a resistance connected across said source, a connection from the positive end of said resistance to said anode, a connection from the negative end of said resistance to said control grid, means for conductively connecting the cathode to a single intermediate point on said resistance, and a separate source of energy for heating said cathode.

5. In a radio communication apparatus the combination of a space discharge device having an anode, a filament and a control electrode, means for impressing signal variations between said filament and said control electrode, a source of energy for heating said filament, a separate source of energy, a resistance shunted across said separate source of energy, a connection from said filament to an intermediate point on said resistance, a connection from said anode to a point on said resistance at one side of said intermediate point, and a connection from said control electrode to a point on said resistance at the other side of said intermediate point, whereby the potential of any point on said filament is intermediate between the potentials of said anode and said control electrode.

6. In combination a space discharge device having an anode, a cathode and a control electrode, means for supplying energy to heat the cathode of said device, means for impressing signal variations between the cathode and the control electrode of said device, a source of energy separate from the first mentioned means for supplying unidirectional potential for said device, a resistance shunted across said source of energy, a connection from an intermediate point on said resistance to said cathode, a connection from a second point on said resistance to said anode, said second point being positive with respect to said intermediate point, and a connection from a third point on said resistance to said control electrode, said third point being negative with respect to said intermediate point, whereby the cathode of said device is maintained at a potential intermediate between the anode and control electrode potentials.

7. In combination a space discharge device having an anode, a cathode and a control grid, an input circuit connected between said cathode and said control grid, means for impressing signal variations upon said input circuit, a source of energy for heating said cathode, a separate source of energy, a grid-biasing resistance connected between said cathode and said control grid, and means for causing current from said separate source of energy to pass through said grid-biasing resistance in a direction to produce a desired normal difference of potential between said cathode and said control grid, said means including a path which is external of said device and which is connected in parallel with the space discharge path of said device, and connections for supplying current to said grid-biasing resistance which passes through the space discharge path of said device and other current which passes through said parallel path.

8. In combination, a space discharge device having an anode, a filament and a control electrode, an input circuit connecting said filament with said control electrode, means for impressing signal variations upon said input circuit, a source of energy for heating said filament, a separate source of energy, a resistance connected between said filament and said control electrode, and means for causing current from said separate source of energy to pass through said resistance in a direction from the filament end to the control electrode end, said means including a path which is external of said device and which is connected in parallel with the space discharge path of said device, and connections for supplying current from said separate source of energy to said resistance, part of which passes through the space-discharge path of said device and the remainder of which passes through said parallel path external of said device.

9. In a radio set, the combination of an amplifying tube having an anode, a cathode and a control electrode, means for impressing between said cathode and said control electrode potential variations which correspond to the signal to be amplified, a source of energy for heating said cathode, a separate source of direct current energy, a connection from the positive side of said source of direct current to said anode, a connection from the negative side of said source of direct current to said control electrode, a resistance connected between said cathode and the negative side of said source of direct current energy, and means other than the space current path of said amplifying tube and separate from said resistance for providing a direct current path between said cathode and the positive side of said source of direct current energy.

10. A circuit arrangement including a plurality of cascade-connected stages constructed to function for detection and amplification, each stage comprising an electric discharge device having an anode, a cathode, and a control electrode and one of said stages being a detector, a common source of voltage connected to the anode and cathode of a plurality of stages for supplying space current to said devices, impedances traversed by current from said source and connections from the control electrodes of said devices and from the cathodes of the devices to the impedances arranged to cause said impedances to bias the grid of the detector positively with respect to its cathode and the grid of an amplifier negatively with respect to its cathode, and means for by-passing alternating currents around at least a portion of said impedances.

11. A circuit arrangement including a plurality of cascade-connected stages, each stage comprising an electric discharge device having an anode, a cathode, and a control electrode, a common source of voltage connected to the anode and cathode of a plurality of stages for supplying space current to said devices, means for holding the cathodes of a plurality of the devices at like direct current potential, impedances traversed by current from said source and connections from the control electrodes of said last-mentioned plurality of devices and from the cathodes of said last-mentioned devices to the impedances arranged to cause said impedances to bias the grids of such devices differently with respect to their cathodes, and means for by-passing alternating currents around at least a portion of said impedances.

12. A circuit arrangement including a plurality of cascade-connected stages, each stage comprising an electric discharge device having a cathode element, a control element, and an anode, a common source of voltage connected to the anode and cathode element of a plurality of stages for supplying space current to said devices, means for holding like elements of a plurality of said devices at like direct current potential, impedances traversed by current from said source, and connections from the control elements of said last-mentioned devices and from the cathodes of the last-mentioned devices to the impedances arranged to cause said impedance to bias the control elements of the last-mentioned devices differently with respect to their cathodes, and means for by-passing alternating currents around at least a portion of said impedances.

13. A receiving set comprising an electric discharge device having an anode, a cathode, and a control electrode, a source of voltage connected to the anode and cathode of the device for supplying space current to it, an impedance traversed by current from said source, a connection between the control electrode and the cathode of said device, said connection including at least a portion of said impedance, means for by-passing alternating currents around said impedance, an antenna or other collector of energy, and connections from said energy collector to ground including said by-passing means and at least a portion of said impedance.

14. A multi-stage set having a plurality of cascade-connected stages, each comprising an electric discharge device having an anode, a cathode, and a control electrode, a source of voltage connected to the anode and cathode of a plurality of stages for supplying space current to said devices, an impedance traversed by current from said source, a connection between the control electrode of one device and the cathode of said one device, said connection including at least a portion of said impedance, means for by-passing alternating currents around said impedance, an antenna or other collector of energy, connections from said energy collector to ground including said by-passing means and at least a portion of said impedance, and a variable reactance in the input circuit of the first of the cascade-connected devices for tuning the antenna.

15. In combination an amplifying tube having an anode, a cathode and a control electrode, a source of direct current, a connection from the positive side of said source of direct current to said anode, a connection from the negative side of said source of direct current to said control electrode, a circuit for supplying current from a separate source of energy to heat said cathode, a connection for passing direct current from the negative side of the output of said source of direct current to a point having approximately the same potential drop to both sides of the cathode heating circuit, said last mentioned connection including a resistance whereby the potential of said cathode will be more positive than the potential of said control electrode, and a conductive path across the output of said source of direct current, said conductive path including a resistance connected between said anode and another of the tube electrodes.

16. A wave repeating system comprising a plurality of stages connected in cascade, a space discharge device including an anode, a cathode and a grid electrode in each of said amplifying stages, a circuit for supplying cathode heating current to each of said space discharge devices, a source of direct current separate from said circuit, and means for supplying anode potentials and positive and negative grid polarizing potentials to said space discharge devices from said source of direct current, said means including impedance means traversed by current from said source.

17. In a radio receiver the combination of a detector stage and a plurality of amplifying stages connected in cascade, an electron discharge device in each stage, an anode, a cathode and a grid electrode in each device, a source of current for heating said cathodes, a lead common to said cathodes, a source of unidirectional voltage, a resistance member provided with a plurality of taps connected across the output of said rectifying means, and connections from said taps to the lead common to said cathodes, to the anodes and to the grids of said devices for applying anode voltage and positive and negative grid biasing voltages to said devices.

JULIUS GOURGUES ACEVES.